United States Patent
Dawson et al.

(10) Patent No.: US 6,731,025 B2
(45) Date of Patent: May 4, 2004

(54) MOTOR WITH LINEAR AND ROTARY MOTION

(75) Inventors: Gerald L. Dawson, New Port Richey, FL (US); James P. Redden, Versailles, KY (US)

(73) Assignee: Kaba-Mas Corporation, Lexington, KY (US)

(*) Notice: Subject to any disclaimer, the term of this patent is extended or adjusted under 35 U.S.C. 154(b) by 31 days.

(21) Appl. No.: 09/832,936

(22) Filed: Apr. 12, 2001

(65) Prior Publication Data

US 2002/0047317 A1 Apr. 25, 2002

Related U.S. Application Data

(60) Provisional application No. 60/196,854, filed on Apr. 12, 2000.

(51) Int. Cl.[7] .............................................. H02K 41/00
(52) U.S. Cl. ........................................................ 310/12
(58) Field of Search ............................................ 310/12

(56) References Cited

U.S. PATENT DOCUMENTS

| | | | | |
|---|---|---|---|---|
| 3,394,295 A | * | 7/1968 | Cory ............................ 310/12 |
| 3,441,819 A | * | 4/1969 | Palmero ....................... 310/12 |
| 3,453,510 A | * | 7/1969 | Kreuter et al. ................ 310/14 |
| 3,745,433 A | * | 7/1973 | Kelby et al. ................. 318/115 |
| 3,889,165 A | * | 6/1975 | Van Nguyen ............... 318/115 |
| 4,099,106 A | * | 7/1978 | Nikaido ....................... 318/115 |
| 4,149,424 A | * | 4/1979 | Bowcott ........................ 74/7 A |
| 4,184,378 A | * | 1/1980 | Mazzorana ................... 74/7 A |
| 4,197,488 A | * | 4/1980 | Kant ............................ 318/115 |
| 4,234,831 A | * | 11/1980 | Kemmer et al. ............. 318/115 |
| 4,281,263 A | * | 7/1981 | Virolleau et al. .............. 310/13 |
| 4,286,181 A | * | 8/1981 | Guzman et al. ........... 310/49 R |
| 4,614,128 A | * | 9/1986 | Fickler ....................... 74/89.31 |
| 4,637,267 A | * | 1/1987 | Mazzorana ................... 74/7 A |
| 4,920,292 A | * | 4/1990 | Albrecht et al. ............. 310/114 |
| 5,038,061 A | * | 8/1991 | Olsen ........................... 310/15 |
| 5,093,596 A | * | 3/1992 | Hammer ...................... 310/191 |
| 5,117,128 A | * | 5/1992 | Albrecht et al. ............. 310/191 |
| 5,291,084 A | * | 3/1994 | Shiotsuki et al. ........... 310/49 R |
| 5,685,214 A | * | 11/1997 | Neff et al. ..................... 92/31 |
| 5,761,962 A | * | 6/1998 | Aiso et al. .................. 74/424.6 |
| 5,886,438 A | * | 3/1999 | Kawanishi .................... 310/90 |
| 5,966,988 A | * | 10/1999 | Aiso et al. .................. 74/89.24 |
| 6,137,195 A | * | 10/2000 | Chitayat ....................... 310/12 |
| 6,362,547 B1 | * | 3/2002 | Peterson et al. ............... 310/80 |
| 6,429,611 B1 | * | 8/2002 | Li .............................. 318/115 |
| 6,433,447 B1 | * | 8/2002 | Kitazawa et al. ............. 310/12 |
| 6,531,798 B1 | * | 3/2003 | Palmero ...................... 310/112 |
| 6,555,941 B1 | * | 4/2003 | Zepp et al. .................. 310/191 |

* cited by examiner

*Primary Examiner*—Nicholas Ponomarenko
*Assistant Examiner*—Pedro J. Cuevas
(74) *Attorney, Agent, or Firm*—Arent Fox Kintner Plotkin & Kahn, PLLC; Rustan Hill

(57) ABSTRACT

A motor that is capable of both linear and rotational motion. One coil translates the motor along its axis for linear motion and a second coil causes the shaft to rotate. Coacting with the translate coil is a translate magnet where the north and south poles are oriented along the motor shaft. A segmented magnet where alternating north and south poles are located along the periphery of the magnet interacts with a rotation coil so that the interaction of the magnetic field of the segmented magnet and the magnetic field produced by the rotation coil cause the rotary magnet to rotate. Rotation of the rotary magnet, which cooperates with the shaft to which it is operably connected, causes rotation of the motor shaft.

3 Claims, 5 Drawing Sheets

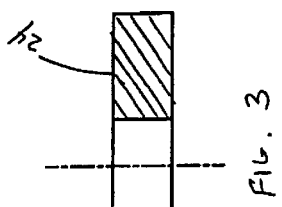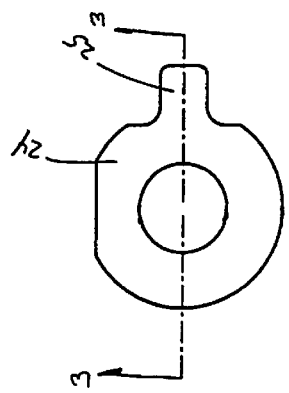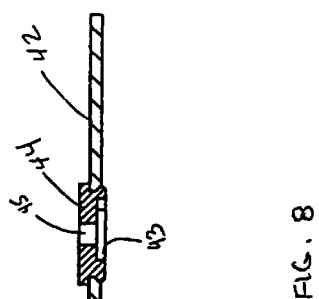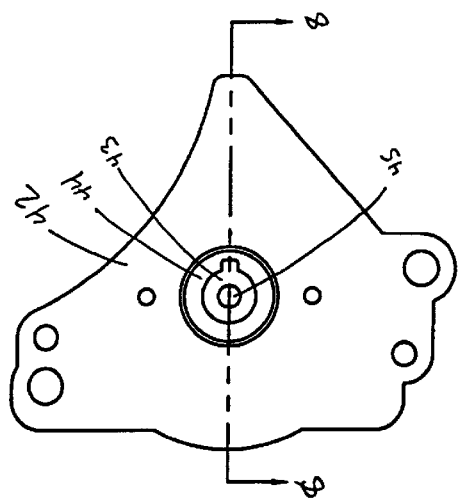

MOTOR WITH LINEAR AND ROTARY MOTION

This applications claims the benefit of U.S. Provisional Application No. 60/196,854 filed on Apr. 12, 2000.

BACKGROUND

1. Field of the Invention

This invention relates to the field of electric motors and specifically to electric motors that are capable of both linear and rotary motion.

2. Description of the Related Art

Electric motors including dc stepper motors have been utilized in many applications. Some of these applications have included those where the electric motors have been subjected to vibration shock and other external forces. Unfortunately, due to the nature of electric motors, it has not been possible to prevent external forces from causing the rotation of the motor shaft. Consequently, there is a need for an electric motor that is prevented from rotating until energized.

SUMMARY OF THE INVENTION

The present invention solves the problem discussed above and is a motor capable of both axial/linear displacement and rotation. This motor uses one coil to translate the motor along its axis for linear motion and a second coil to cause the shaft to rotate. Coacting with the translate coil is a translate magnet where the north and south poles are oriented along the motor shaft. A segmented magnet where alternating north and south poles are located along the periphery of the magnet is used to interact with the second or rotational coil so that the interaction of the magnetic field of the segmented magnet and the magnetic field produced by the rotation coil causes the rotary magnet to rotate. Rotation of the rotary magnet, which cooperates with the shaft to which it is operably connected, causes rotation of the motor shaft. To prevent rotation of the motor shaft a key or keyed gear is operably connected to the shaft. This key or keyed gear fits into a detent in the motor casing of an appropriate size and shape or an external detent of an appropriate size and shape. By energizing the translate coil the motor shaft and key or keyed gear is removed from the detent in the casing or external detent so that energizing the rotate coil may cause the rotation magnet and shaft to rotate. The key and its associated detent are designed to limit and/or prevent rotation of the shaft when the key is resting in the detent. Consequently, a motor of this invention would not rotate under the imposition of an external force unless the translate coil was energized.

BRIEF DESCRIPTION OF THE DRAWINGS

The accompanying drawings incorporated in and forming part of the specification illustrates several aspects of the present invention, and together with the description serve to explain the principles of the invention. In the drawings:

FIG. 2 is an end view of a key that may be utilized in the present invention.

FIG. 3 illustrates a cross section view of the key shown in FIG. 2.

FIG. 7 illustrates an end view of a first end plate together with the first end bushing.

FIG. 8 illustrates a cross section of the end plate and end plate bushing illustrated in FIG. 7.

Reference will now be made in detail to the present embodiment of the invention, an example of which is illustrated in the accompanying drawings.

DESCRIPTION OF THE PREFERRED EMBODIMENT

Figure 1:
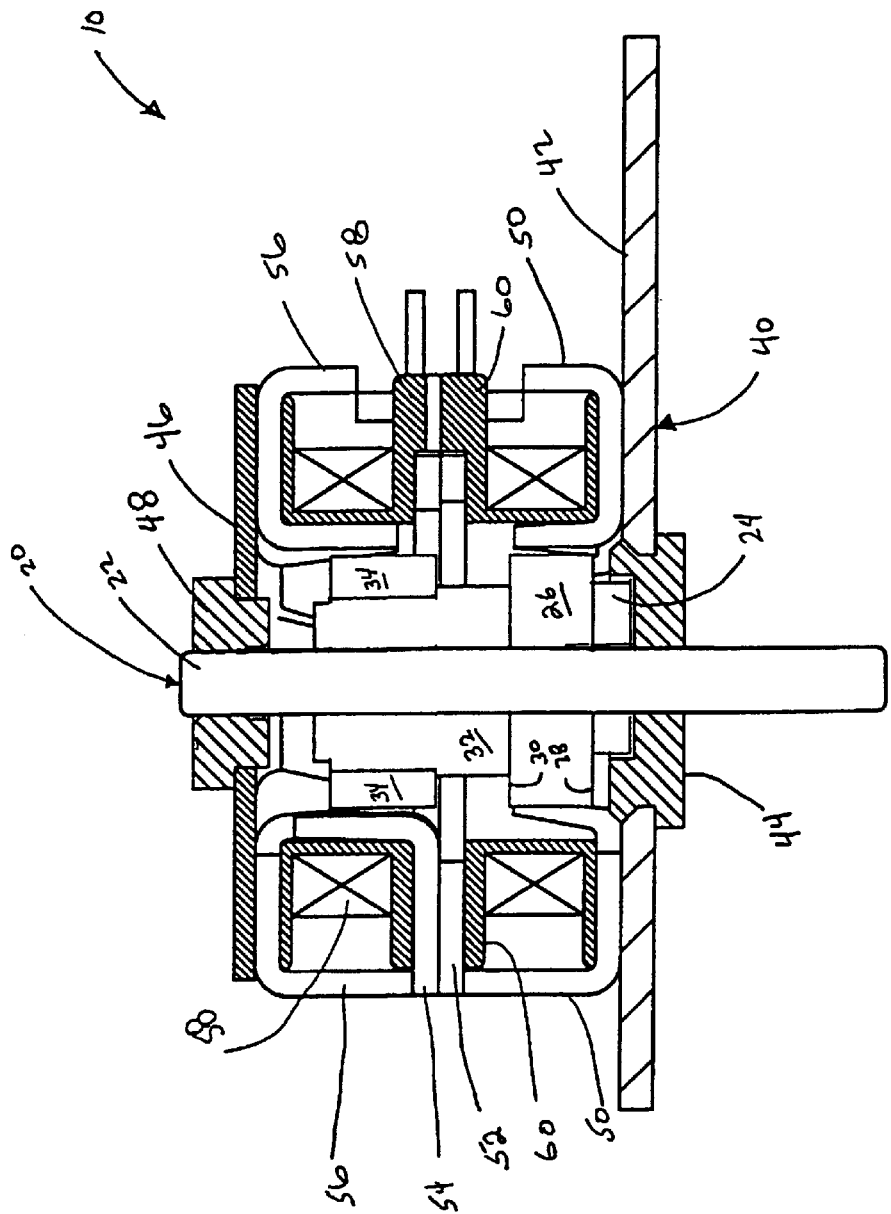
FIG. 1 is a center cross section of an electric motor of the present invention.

FIG. 1 illustrates a cross section view of motor 10 that is capable of both rotary and linear motion. This motor has a rotor assembly 20 and a casing 40.

Figure 4:
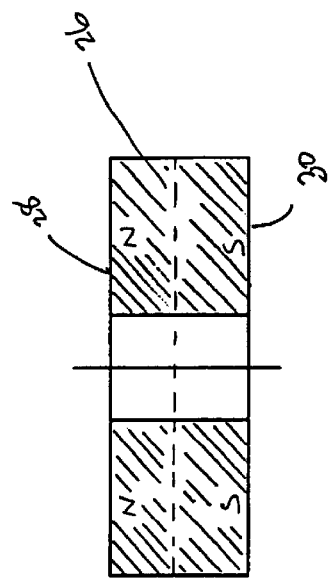
FIG. 4 illustrates an enlarged cross section of the translate magnet shown in FIG. 1.
Figure 5:
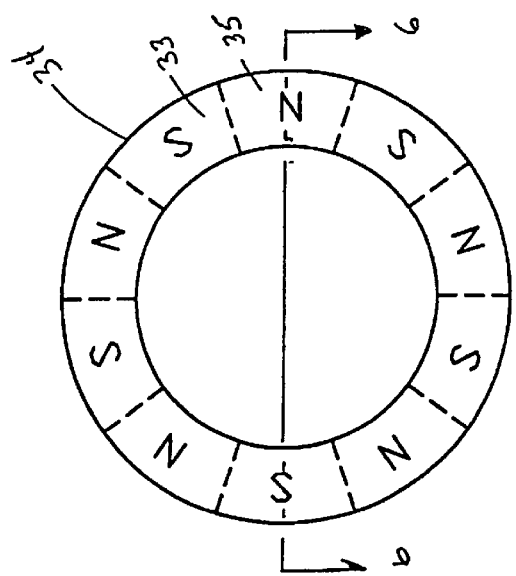
FIG. 5 illustrates an end view of the rotation magnet illustrated in FIG. 1.
Figure 6:
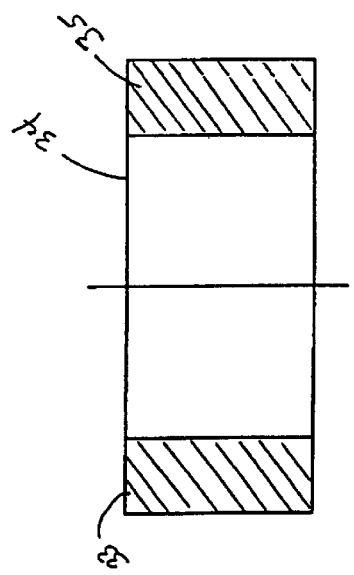
FIG. 6 illustrates a cross sectional view of the rotation magnet shown in FIG. 5.
Figure 11:
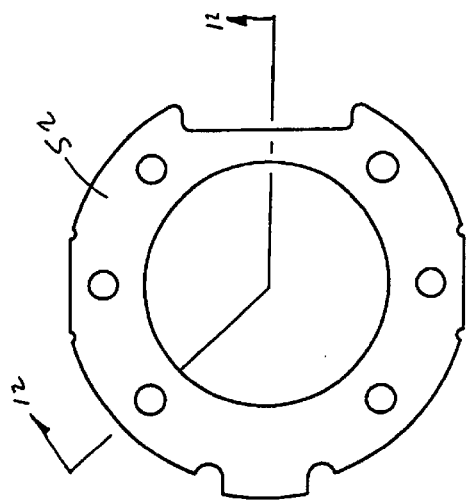
FIG. 11 illustrates a top view of the inside translate yoke shown in FIG. 1.
Figure 12:
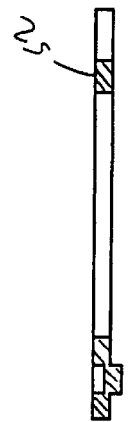
FIG. 12 illustrates a cross section view of the inside translate yoke shown in FIG. 11.
Figure 9:
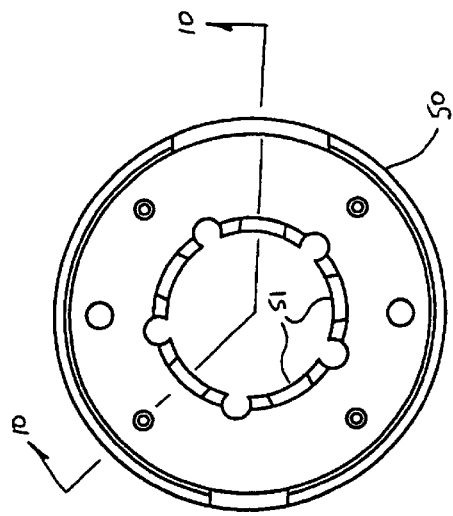
FIG. 9 illustrates a top view of the outside translate yoke shown in FIG. 1.
Figure 10:
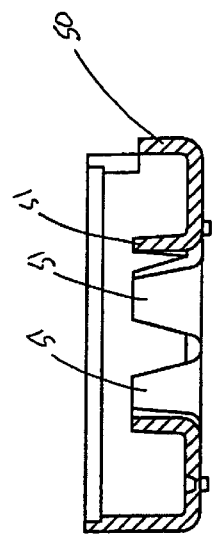
FIG. 10 illustrates a cross section of the outside translate yoke shown in FIG. 9.
Figure 13:
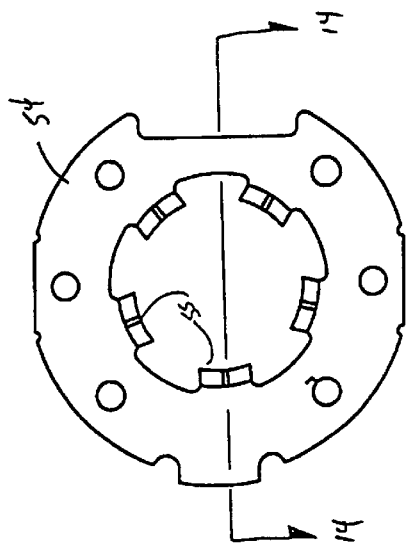
FIG. 13 illustrates a top view of an inside rotational yoke shown in FIG. 1.
Figure 14:
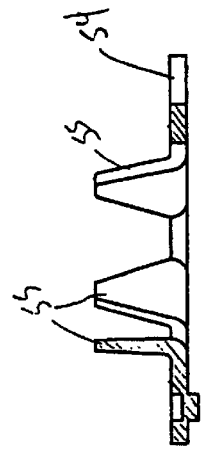
FIG. 14 illustrates a cross section of the inside rotational yoke shown in FIG. 13.
Figure 15:
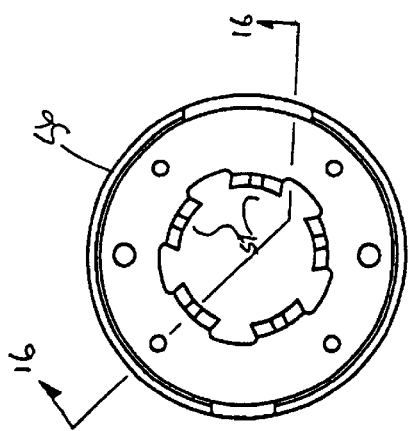
FIG. 15 illustrates a top view of the outside rotation yoke shown in FIG. 1.
Figure 16:
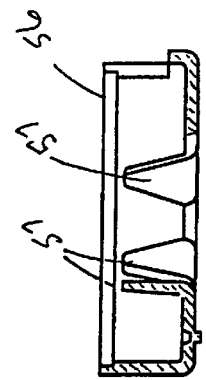
FIG. 16 illustrates a cross section of the outside rotation yoke shown in FIG. 15.

Rotor assembly 20 may be formed from shaft 22, key 24, translate magnet 26, magnet spindle 32, and rotation magnet 34. FIGS. 2 and 3 provides detailed views of key 24. FIG. 4 shows the magnetic polarity for an exemplary translate magnet 26. FIGS. 5 and 6 provide additional details for an exemplary segmented magnet that may be utilized as a rotation magnet 34. Key 24, translate magnet 26, and rotary magnet 34 are operably connected to shaft 22. Rotation magnet 34 may be operably connected to shaft 22 with magnet spindle 32. Typically, key 24 and rotation magnet 34 are operably connected to shaft 22 in such a manner that these pieces will not rotate with respect to shaft 22. Translate magnet 26, however, does not require to be operably connected to shaft 22 in such a manner that rotation of translate magnet 26 with respect to shaft 22 is prevented. Translate magnet 26 may be positioned between key 24 and magnet spindle 32 such that translate magnet 26 is limited or prevented from moving along shaft 22. Since translate magnet 26 is used to move the rotation assembly 20 and key 24 axially to remove key 24 from key indent 43 in key way bushing 44, the only requirement is that translate magnet 26 remain relatively stationary with respect to the axis of shaft 22 when the translate coil 60 is energized and results in linear motion of rotor assembly 20. One method of operably connecting shaft 22 to key 24 and magnetic spindle 32 is by using an interference fit between these parts whereby during assembly the key 24 and magnet spindle 32 are pressed onto shaft 22.

Casing 40 is designed to permit both rotary and linear motion of rotor assembly 20. This casing has a first end plate 42, shown in detail in FIGS. 7 and 8, and a second end plate 46. Inset into each end plate is a bushing. Key way bushing 44 is inserted into a bushing opening in the first end plate 42. The second end bushing 48 is inserted into the second end plate 46. These bushings are selected from materials that typically have low friction coefficients to reduce the amount of power consumed in either the rotation or translation phases of rotor assembly 20.

Between the end plates 42 and 46 are the coils and their supporting yokes that are utilized to create the magnetic fields that cause rotor assembly 20 to move both axially and rotationally. Translation is caused by a combination of the translate coil 60 contained within the outer translation yoke 50 and inner translate yoke 52. Details of yokes 50, 52 are provided in FIGS. 9–12. The coil 60 shown is wound like a bobbin and as a result creates a magnetic field with a different pole at each end of coil 60.

Outer translate yoke 50 has translate fingers 51 that are utilized to direct the magnetic field oriented towards first end plate 42 up and along the sides of translate magnet 26. The use of translate fingers 51 while optional serve to increase the magnetic field experienced by the translate magnet 26. Consequently, a smaller magnetic field is required to be generated by translate coil 60 to cause translate magnet 26 to move rotor assembly 20 the required distance so that key 24 clears key way bushing 44 or keyed gear clears the external detent; permitting motor 10 to rotate.

Inner yoke 52 shown does not have any fingers so that there will not be any competing magnetic field to interfere with the action of the translate magnet 26.

The translate coil 60 lies for the most part between the inner and outer translate yokes 52, 50. Thus, in some embodiments, the inner and outer yoke may provide some structural support to translate coil 60. Since the outer translate yoke 50 may be utilized to direct the magnetic field created by translate coil 60 it is desired but not required that this material be magnetically permeable. Examples of such materials are iron and steel and other ferrous materials.

In the current embodiment the translate coil 60 generates a magnetic field in outer translate yoke 50 that is the same polarity as found at magnet face 28. Consequently, translate magnet 26 is repelled from outer translate yoke 50. Alternatively, the inner translate yoke 52 could be formed with fingers and the outer translate yoke 50 without fingers. In this case the magnetic field generated in inner translate yoke 52 by coil 60 could either attract translate magnet 26 or repell translate magnet 26 depending on the direction of motion utilized to remove key 24 from detent 43 of bushing 44 or keyed gear from the external detent.

Rotation of motor 10 is caused by the combination of the inside and outside rotation yokes 54, 56 and rotation coil 58. Similar to translation coil 60, rotation coil 58 is wound like a bobbin. Consequently, inside and outside rotation yokes 54, 56 have fingers 55, 57 respectively that are employed to direct the magnetic field generated at the ends of coil 58 along the sides of rotation magnet 34. Depending on the use of the motor 10 these fingers may be similar in size and shapes or may have different sizes and shapes as shown by comparing FIGS. 13–16.

In the present invention it is desirable that the motor rotate when an electric current is applied in a predetermined direction. This predetermined direction is caused by using smaller fingers 57 on outside rotation yoke 56. Fingers 57, 55 are interlaced when the outer and inner rotation yokes are assembled. The use of smaller rotation fingers 57 on outside rotation yoke 56 allows one outer rotation finger 57 to be located closer to one of the two inner rotation fingers 55 than to the other rotation finger. This offset of the rotation fingers 55 and 57 results, for example, in a north pole being closer to one of the two south poles between which the north pole is located. Consequently, the motor will turn in a predetermined direction when the rotation coil 58 is energized since a south pole on rotation magnet 34 will be closer to one north pole than to the other north pole to which it might otherwise be attracted. In the current preferred embodiment, this offset is approximately 4 degrees. It is expected, however, that this offset could be reduced or increased depending on the motor application.

In summary, numerous benefits have been described which results from employing the concepts of the invention. The foregoing description of the preferred embodiment of the invention has been presented for the purposes of illustration and description. It is not intended to be exhaustive or to limit the invention to a precise form disclosed. Obvious modifications or variations are possible in light of the above teachings. The embodiment was chosen to describe in order to best illustrate the principles of the invention and its practical application to thereby enable one of ordinary skill in the art to best utilize the invention in various embodiments and with various modifications as there suited particular use contemplated. It is intended that the scope of the invention be defined by the claims appended hereto.

We claim:

1. An electric motor comprising:

a case;

a rotor assembly, the rotor assembly residing inside the case, the rotor supported by the case for both rotary and linear motion;

means for linearly translating said rotor assembly with respect to the case;

means for rotating the rotary assembly with respect to the case; and means for preventing rotation of the rotor assembly until the translating means linearly translates the rotor assembly.

2. A method for operating an electric motor comprising:

restraining the rotation of a rotor assembly when the rotor assembly is in a first position;

energizing a translate coil, the energized coil interacting with the rotor assembly to linearly move the rotor assembly from the first position to a second position where the rotor assembly is free to rotate; and energizing a rotation coil, said energized rotation coil interacting with the rotor assembly to rotate the rotor assembly.

3. An electric motor comprising:

a case;

a rotor assembly, the rotor assembly residing inside the case, the rotor supported by the case for linear and rotary motion;

a first stator assembly residing inside the case, the stator having unequally spaced poles to induce the rotor to turn in a predetermined direction;

a second stator assembly residing inside the case to induce linear motion in the rotor; and a restraining device, the restraining device preventing rotation of the rotor assembly until the rotor assembly is linearly moved by the second stator assembly.

* * * * *